(No Model.)

A. T. LUNDQVIST.
FLOWER STAND.

No. 260,696. Patented July 4, 1882.

WITNESSES:
Fred. G. Dieterich
John G. Hinkel

Alexius T. Lundqvist
INVENTOR,
by Louis Bagger & Co
ATTORNEYS.

UNITED STATES PATENT OFFICE.

ALEXIUS T. LUNDQVIST, OF NEW YORK, N. Y.

FLOWER-STAND.

SPECIFICATION forming part of Letters Patent No. 260,696, dated July 4, 1882.

Application filed May 10, 1882. (No model.)

*To all whom it may concern:*

Be it known that I, ALEXIUS T. LUNDQVIST, of New York, in the county of New York and State of New York, have invented certain new and useful Improvements in Flower-Stands; and I do hereby declare that the following is a full, clear, and exact description of the invention, which will enable others skilled in the art to which it appertains to make and use the same, reference being had to the accompanying drawings, which form a part of this specification, and in which—

Figure 1:
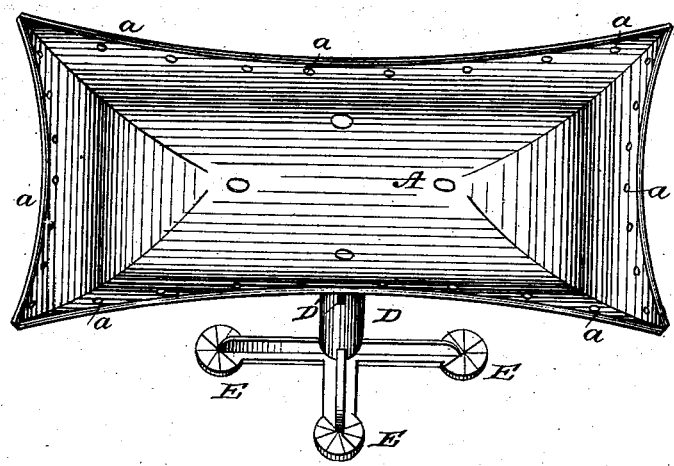
Figure 2:
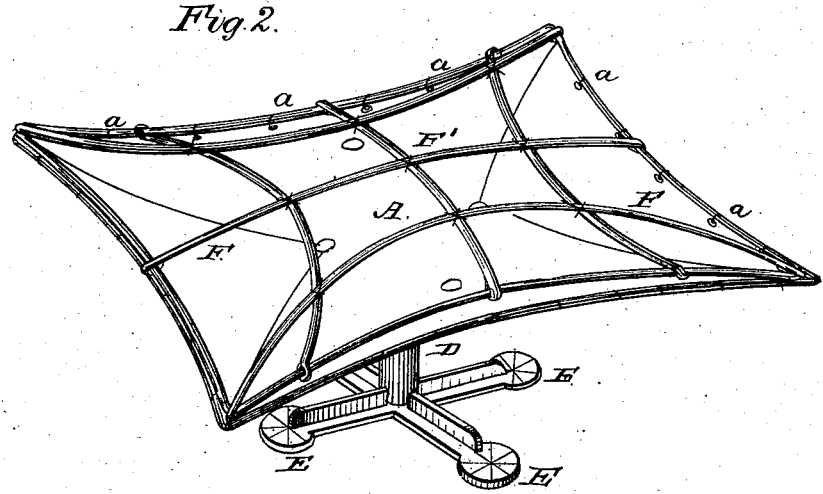
Figure 3:
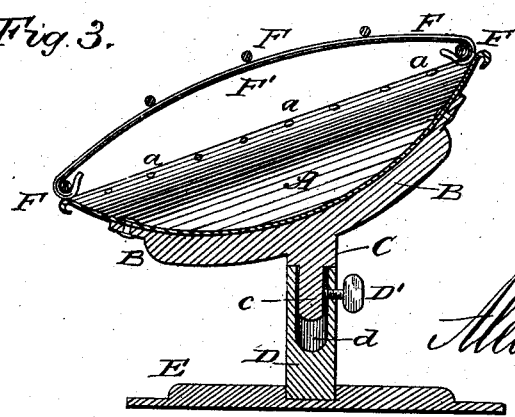

Figure 1 is a perspective view of my improved flower-stand without the wire frame. Fig. 2 is a similar view of the stand with its wire frame in position, and Fig. 3 is a cross-section of the stand with its wire frame and pivotal frame complete.

Similar letters of reference indicate corresponding parts in all the figures.

My invention has relation to devices for holding cut flowers for ornamental purposes; and it consists in the detailed construction and combination of parts of the device or apparatus, hereinafter more fully described and claimed.

In the accompanying drawings, the letter A represents the receptacle for the cut flowers, which is in the nature of a shallow dish, made of tinned sheet-iron, (or other suitable material,) suitably painted, and of the shape of a pillow, heart, or any other ornamental design. In the accompanying illustration of my invention I have shown this dish of the shape of a pillow or cushion.

The dish A is rigidly mounted upon a cross or frame, B, the stem C of which is reduced, as shown at c in Fig. 3, and the reduced end inserted into a socket, d, in the standard D, which is supported on the feet E.

The tenon c may be held in its adjusted position in the socketed standard D by means of a set-screw, D'.

The dish or flower-pan A has a series of apertures, a a, punched along its edges, and F denotes a frame, made of wire, of a shape or outline corresponding to that of the dish or receptacle A, but made bulging toward its middle part, as shown at F'.

The moss and cut flowers are placed in the dish A, which, as will be seen, stands at an angle to the standard C D. It therefore becomes necessary to hold them in place and prevent them from sliding down on one side, which may be done by drawing a thread zigzag through the apertures a from one side to the other, or, better still, by the wire frame F F', the edges of which are tied to the edges of dish A by cords or fine wires inserted through the edge apertures a.

By this device the cut flowers are kept fresh much longer than when kept in a wire frame bottomed by tin-foil. There is no expense for renewal of the foil, and the dish may be adjusted by loosening the set-screw D' and turning stem C c in its socket, so that the feet E may be fixed permanently in the show-window or wherever else used without affecting the adjustment of the dish.

Having thus described my invention, I claim and desire to secure by Letters Patent of the United States—

The combination, in a stand or receptacle for cut flowers, of the dish or pan A, having apertures a along its edge, and set at a suitable angle on the cross or frame B, having stem C c, socketed standard D, having feet E and set-screw D', and wire frame F F' of a shape or outline conforming to that of the dish A, all constructed and arranged substantially as and for the purpose herein shown and described.

In testimony that I claim the foregoing as my own I have hereunto affixed my signature in presence of two witnesses.

ALEXIUS THEODOR LUNDQVIST.

Witnesses:
W. STRAS, Jr.,
CHAS. A. WIRTHLE.